(12) United States Patent
Patel et al.

(10) Patent No.: US 11,195,415 B2
(45) Date of Patent: *Dec. 7, 2021

(54) LANE CHANGE NOTIFICATION

(71) Applicant: Waymo LLC, Mountain View, CA (US)

(72) Inventors: Nirmal Patel, Sunnyvale, CA (US); Peter Crandall, San Jose, CA (US); Julien Mercay, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/749,541

(22) Filed: Jan. 22, 2020

(65) Prior Publication Data

US 2020/0234588 A1     Jul. 23, 2020

Related U.S. Application Data

(63) Continuation of application No. 15/783,653, filed on Oct. 13, 2017, now Pat. No. 10,580,299.

(51) Int. Cl.
    *G08G 1/137*         (2006.01)
    *G01C 21/36*        (2006.01)
    (Continued)

(52) U.S. Cl.
    CPC ......... *G08G 1/137* (2013.01); *G01C 21/3635* (2013.01); *G01C 21/3647* (2013.01);
    (Continued)

(58) Field of Classification Search
    CPC ...... G08G 1/137; G08G 1/167; G05D 1/0214; G05D 1/0212; G05D 1/0088;
    (Continued)

(56) References Cited

U.S. PATENT DOCUMENTS 7,027,616 B2 *    4/2006    Ishii ..................... G06T 7/30
                                                                     382/104
7,161,616 B1 *    1/2007    Okamoto .............. G06T 3/4038
                                                                     348/148

(Continued)

FOREIGN PATENT DOCUMENTS

| IN | 03438DN2014 | 7/2015 |
|----|----|----|
| JP | 2015023484 A | 2/2015 |
| JP | 2017182585 A | 10/2017 |

*Primary Examiner* — Dale W Hilgendorf
(74) *Attorney, Agent, or Firm* — Botos Churchill IP Law

(57) ABSTRACT

Aspects of the disclosure relate providing a lane change notification when a vehicle is to perform a lane change. One or more computing devices may generate and display a video, where the video is generated from a perspective of a virtual camera at a default position and default pitch. The one or more computing devices may receive an indication that the vehicle is to perform a lane change from a first lane to a second lane and adjust, after the vehicle receives the indication, the default position and default pitch of the virtual camera to an updated position further above the vehicle relative to ground than the default position and an updated pitch directed more towards the ground than the default pitch. The video may be generated and displayed from the perspective of the virtual camera at the updated position and updated pitch.

20 Claims, 13 Drawing Sheets

(51) Int. Cl.
  *G05D 1/02* (2020.01)
  *G06K 9/00* (2006.01)
  *G06T 19/00* (2011.01)
  *G05D 1/00* (2006.01)
  *G08G 1/16* (2006.01)

(52) U.S. Cl.
  CPC ....... *G01C 21/3658* (2013.01); *G05D 1/0088* (2013.01); *G05D 1/0212* (2013.01); *G05D 1/0214* (2013.01); *G06K 9/00791* (2013.01); *G06K 9/00798* (2013.01); *G06T 19/006* (2013.01); *G08G 1/167* (2013.01); *G06T 2207/30252* (2013.01)

(58) Field of Classification Search
  CPC ............ G01C 21/3658; G01C 21/3647; G01C 21/3635; G06K 9/00791; G06K 9/00798; G06T 19/006; G06T 2207/30252
  See application file for complete search history.

(56) References Cited

U.S. PATENT DOCUMENTS

| | | | |
|---|---|---|---|
| 7,307,655 B1* | 12/2007 | Okamoto | G06K 9/00791 |
| | | | 348/222.1 |
| 8,738,213 B1 | 5/2014 | Szybalski et al. | |
| 9,403,483 B2* | 8/2016 | Kitaura | B60R 1/00 |
| 9,475,430 B2* | 10/2016 | Kitaura | H04N 7/18 |
| 9,840,199 B2* | 12/2017 | Kitaura | G06T 3/0056 |
| 10,116,873 B1 | 10/2018 | Campbell | |
| 10,580,299 B2* | 3/2020 | Patel et al. | G01C 21/3647 |
| 2014/0043466 A1* | 2/2014 | Sato et al. | B60R 1/00 |
| | | | 348/115 |
| 2016/0052394 A1 | 2/2016 | Yamada | |
| 2016/0252358 A1 | 9/2016 | Blumenberg et al. | |
| 2016/0252363 A1 | 9/2016 | Tertoolen | |
| 2016/0349066 A1 | 12/2016 | Chung et al. | |
| 2017/0003134 A1 | 1/2017 | Kim et al. | |
| 2017/0011269 A1* | 1/2017 | Yamaguchi | G06K 9/00798 |
| 2018/0111612 A1* | 4/2018 | Jiang | B60R 1/00 |
| 2018/0286095 A1 | 10/2018 | Kusayanagi et al. | |

* cited by examiner

LANE CHANGE NOTIFICATION

CROSS-REFERENCE TO RELATED APPLICATIONS

The present application is a continuation of U.S. patent application Ser. No. 15/783,653 filed Oct. 13, 2017, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.).

These characteristics can be used to provide to occupants of the vehicle a visual indication of objects detected in the vicinity of a vehicle as well as what those objects are likely to do for some brief period into the future. For instance, a display in the vehicle may present a video generated by a video display system from the perspective of a virtual camera fixed relative to the vehicle at a default position. The video may include imagery within a set field of view corresponding to the position of the virtual camera including a portion of the vehicle's surroundings and the vehicle's projected trajectory.

In addition, messages may be overlaid on the video to inform passengers of the vehicle's actions and information regarding the vehicle's route. For instance, the display may include messages overlaid on the video regarding the vehicle's speed, the street the vehicle is travelling on, and the street's speed limit.

BRIEF SUMMARY

Embodiments within the disclosure relate generally to providing a lane change notification when a vehicle is to perform a lane change. In one aspect, a method may include generating and displaying, by one or more computing devices, a video indicating a projected trajectory of the vehicle and objects detected by sensors on the vehicle, on a map corresponding to a route the vehicle is currently following, where the video is generated from a perspective of a virtual camera at a default position and default pitch; receiving, by one or more computing devices, an indication that the vehicle is to perform a lane change from a first lane to a second lane; adjusting, after the vehicle receives the indication, the default position and default pitch of the virtual camera to an updated position further above the vehicle relative to ground than the default position and an updated pitch directed more towards the ground than the default pitch; and generating and displaying, the video from the perspective of the virtual camera at the updated position and updated pitch.

In some embodiments, after the vehicle completes the lane change, the updated position and the updated pitch of the virtual camera may be adjusted to the default position and the default pitch and video from the perspective of the virtual camera at the default position and default pitch may be generated and displayed.

In some embodiments, an object detected by the sensors which prevent the vehicle from performing the lane change may be highlighted. In some embodiments when the object is no longer preventing the vehicle from performing the lane change, the object may no longer be highlighted when displaying the video.

In some embodiments, the adjusting of the virtual camera to the updated position occurs upon the vehicle beginning to perform the lane change. In some embodiments the adjusting of the virtual camera to the updated position occurs a predetermined time after receiving the indication.

In some embodiments, a visual indicator which indicates the direction from the first lane to the second lane is generated and overlaid on the video. In some embodiments the visual indicator is removed upon completion of the lane change.

In some embodiments, the projected trajectory of the vehicle is updated to show the trajectory of the vehicle during the lane change. In some embodiments the updated position above the vehicle is a predefined height based on the vehicle's speed.

Another aspect may include a system for providing a lane change notification when a vehicle is to perform a lane change. The system may comprise one or more processors configured to: generate and display a video indicating a projected trajectory of the vehicle and objects detected by sensors on the vehicle, on a map corresponding to a route the vehicle is currently following, where the video is generated from a perspective of a virtual camera at a default position and default pitch; receive an indication that the vehicle is to perform a lane change from a first lane to a second lane; adjust, after the vehicle receives the indication, the default position and default pitch of the virtual camera to an updated position further above the vehicle relative to ground than the default position and an updated pitch directed more towards the ground than the default pitch; and generate and display, the video from the perspective of the virtual camera at the updated position and updated pitch.

DETAILED DESCRIPTION

Overview

Figure 1:
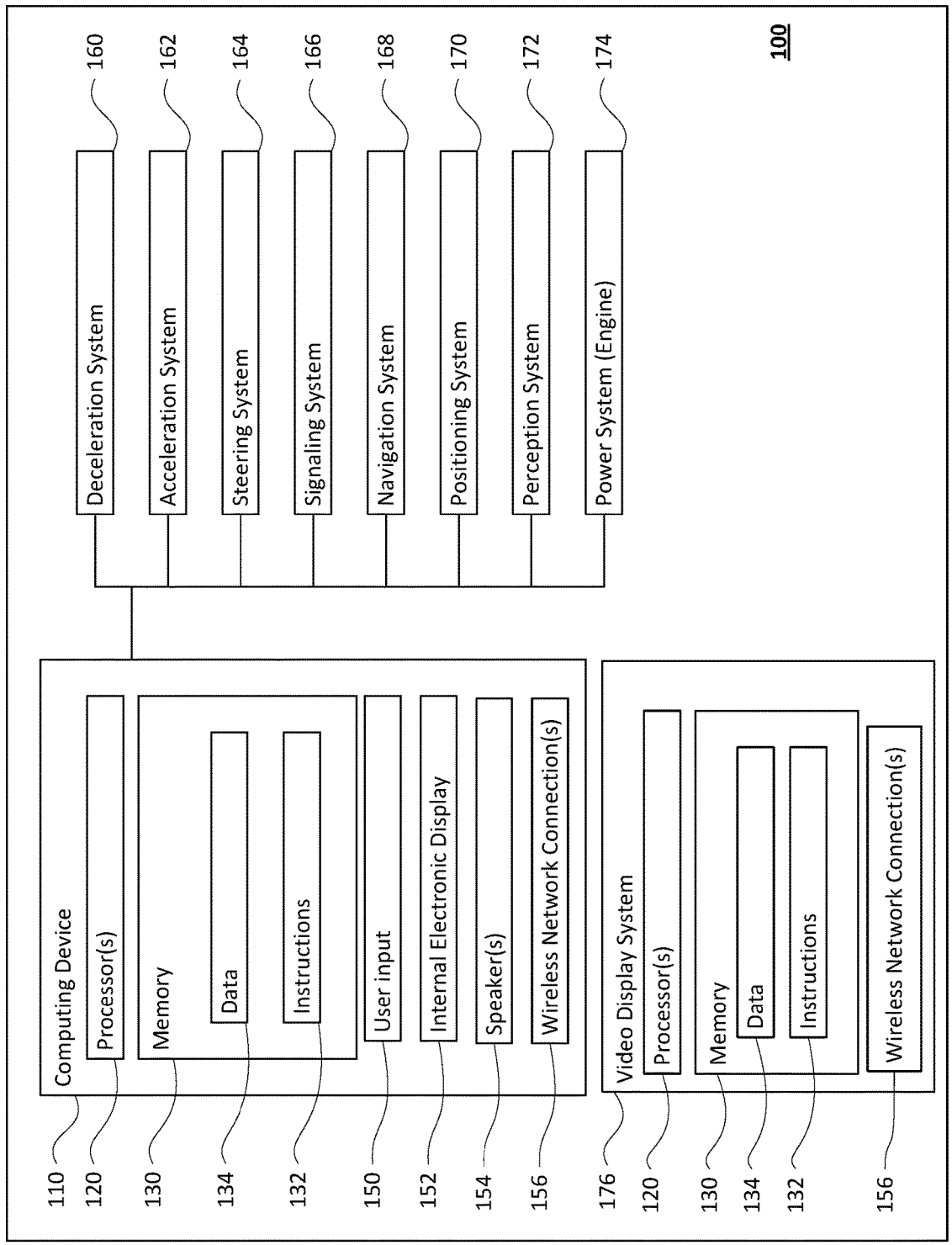
FIG. 1 is a functional diagram of an example vehicle in accordance with aspects of the disclosure.

The technology relates to adjusting the position and orientation of a virtual camera when a vehicle is changing lanes. For instance, during a trip a computing device may display information to the passengers about how the vehicle "sees" its surrounding environment. This may include displaying a video of the environment, the objects in that environment, and a virtual representation of the vehicle.

The video may be displayed from the perspective of a virtual camera angled above and behind the vehicle. In this regard, computing devices within the vehicle may provide data including a vehicle's projected trajectory as well as data indicating objects, such as other vehicles, within the vicinity of the vehicle. This data may be used to generate the video from the perspective of a virtual camera using the received data by overlaying the vehicle's projected trajectory and detected objects on a map. The map may correspond to an area of a route on which the vehicle is traveling or following.

Upon the vehicle performing a lane change or receiving a notification that a lane change is to occur, the perspective of the virtual camera may be rotated above the vehicle to a predetermined height to present video within an adjusted field of view corresponding to the vehicle's immediate surroundings. In this regard, the virtual camera may rotate from a default position, to a predetermined height above the vehicle during a lane change. The pitch of the camera may be adjusted concurrently, or sequentially with, the rotation of the virtual camera such that the video will provide imagery located behind the vehicle, thereby providing passengers with a natural view of their surroundings without blind spots. During, or upon completion of the lane change, the virtual camera may return to the default position.

Visual indicators indicating that a lane change is to occur may be overlaid on the video. In this regard, the video display system may overlay a visual indicator, such as arrows, chevrons, or other such indicator, on the video to inform the vehicle's passengers that a lane change is going to occur. In some instances, the visual indicators may indicate the direction towards the lane the vehicle is going to change into. The projected trajectory of the vehicle as depicted in the video may be updated to show where the vehicle will perform the lane change.

Objects within the vehicle's vicinity that are impacting the vehicle's ability to perform a lane change may be highlighted. In this regard, the video display system may, upon receiving a notification that the vehicle is going to change lanes, highlight, pulse, or otherwise provide a visual indication of objects, such as vehicles which are influencing the vehicle's ability to change lanes in the video.

The features described herein may allow a vehicle, such as an autonomous vehicle, to provide video of the vehicle's trajectory and surroundings to its passenger. By rotating and adjusting the pitch of the virtual camera generating the video, the passengers are provided with an informative and natural view of their surroundings without blind spots. As such, passengers are provided with information regarding the vehicle's actions which can provide a sense of reassurance and safety to the passengers. Moreover, such information may relieve a passenger's anxiety about reaching their final destination after exiting the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as BLUETOOTH, BLUETOOTH low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, perception system 172, and video camera system 176 in order to control the movement, acceleration, speed, operation, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways.

Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing device 110. As discussed in further detail below, computing device 110 may use the positioning system 170 to determine the vehicle's location and perception system 172 to detect and respond to objects when needed to reach the location safely.

The video display system 176 may monitor data from the systems of the vehicle to generate a video of the vehicle's surroundings for display in the vehicle. In this regard, the video display system 176 may monitor system data generated by the other computing devices regarding the vehicle's operation including data representing the vehicle's past, present, and future operation. The video display system 176 may also monitor messages sent to and from the vehicle's computing device 110, which is in communication with the different systems and computing devices of the vehicle. For instance, the video display system 176 may aggregate data from the vehicle's perception system 172, such as objects external to the vehicle within a particular range, data from the positioning system 170, such as the vehicle's current location, and data from the navigation system 168, such as the vehicle's projected trajectory and map information, as described above.

The video display system 176 may take the monitored data and messages and generate a video of the vehicle's surroundings and the vehicle's projected trajectory. In this regard, the video may include imagery within a set field of view corresponding to the position of a virtual camera including a portion of the vehicle's surroundings and the vehicle's projected trajectory. In this regard, the video display system 176 may overlay the vehicle's projected trajectory and detected objects on a map corresponding to the route the vehicle is traveling. The video generated by the video display system 176 may be presented to the vehicle's passengers, other individuals, or recorded for future viewing, such as on a display in the vehicle.

The video display system 176 may include some or all of the components of the computing device 110 as described herein, such as processor 120, memory 130, data 134, instructions 132, wireless network connections 156, and display (not shown). Likewise, in addition to, or alternatively to the functions of the video display system 176 described herein, the video display system 176 may perform the functions of a computing device 110. In this regard, the video display system 176 may communicate with the various systems of the vehicle, such as systems 160-174.

Figure 2:
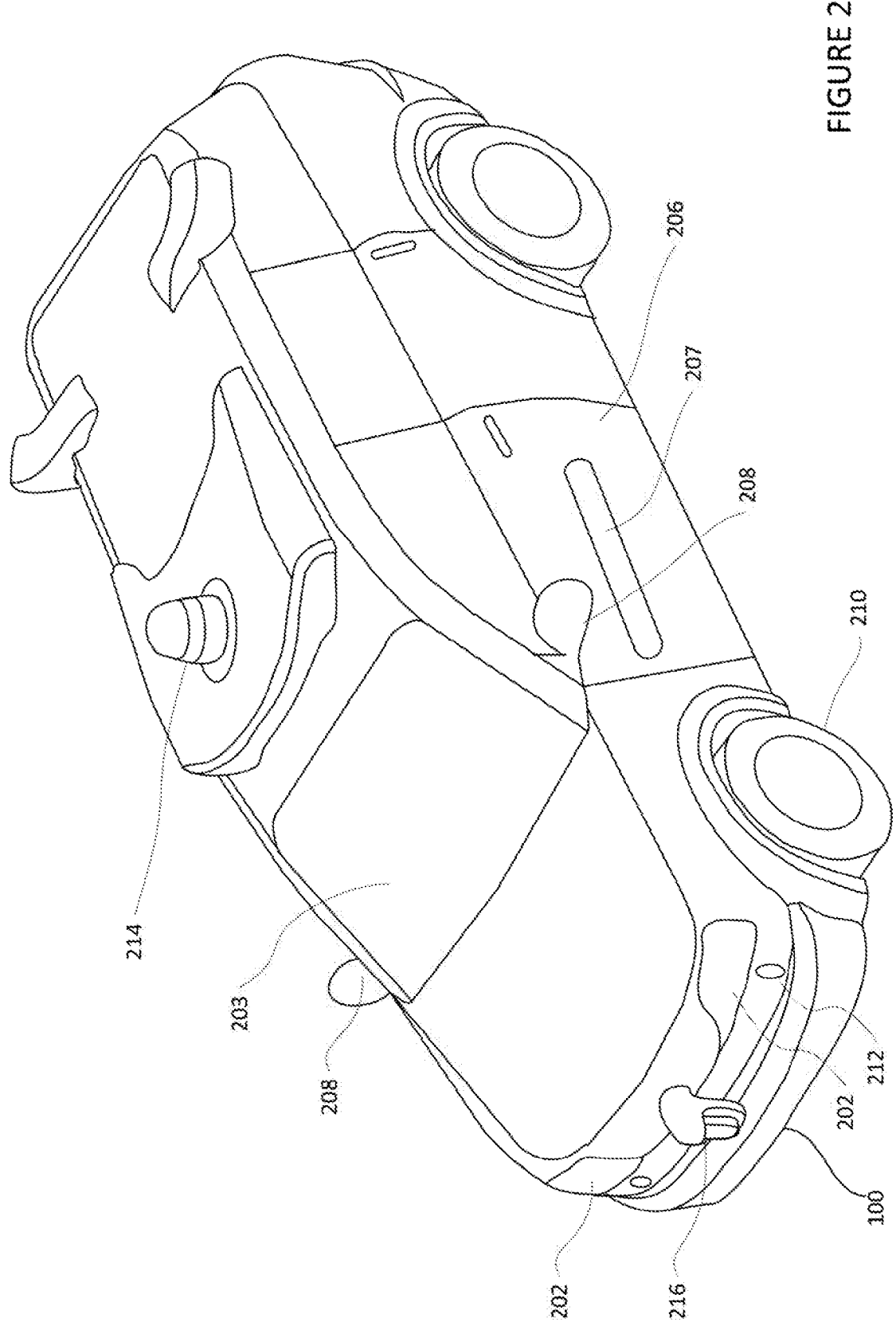
FIG. 2 is a perspective external view of a vehicle in accordance with aspects of the disclosure.
Figure 3:
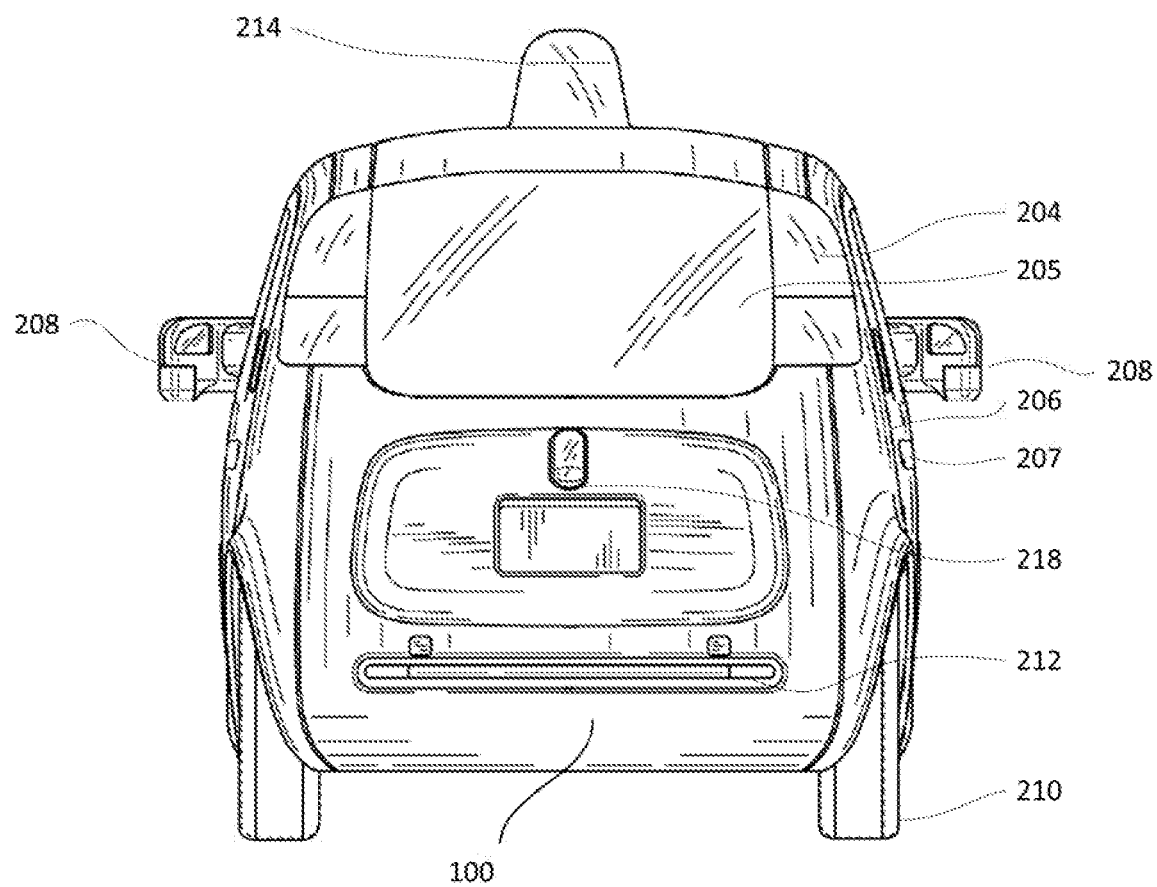
FIG. 3 is a rear external view of a vehicle in accordance with aspects of the disclosure.
Figure 4:
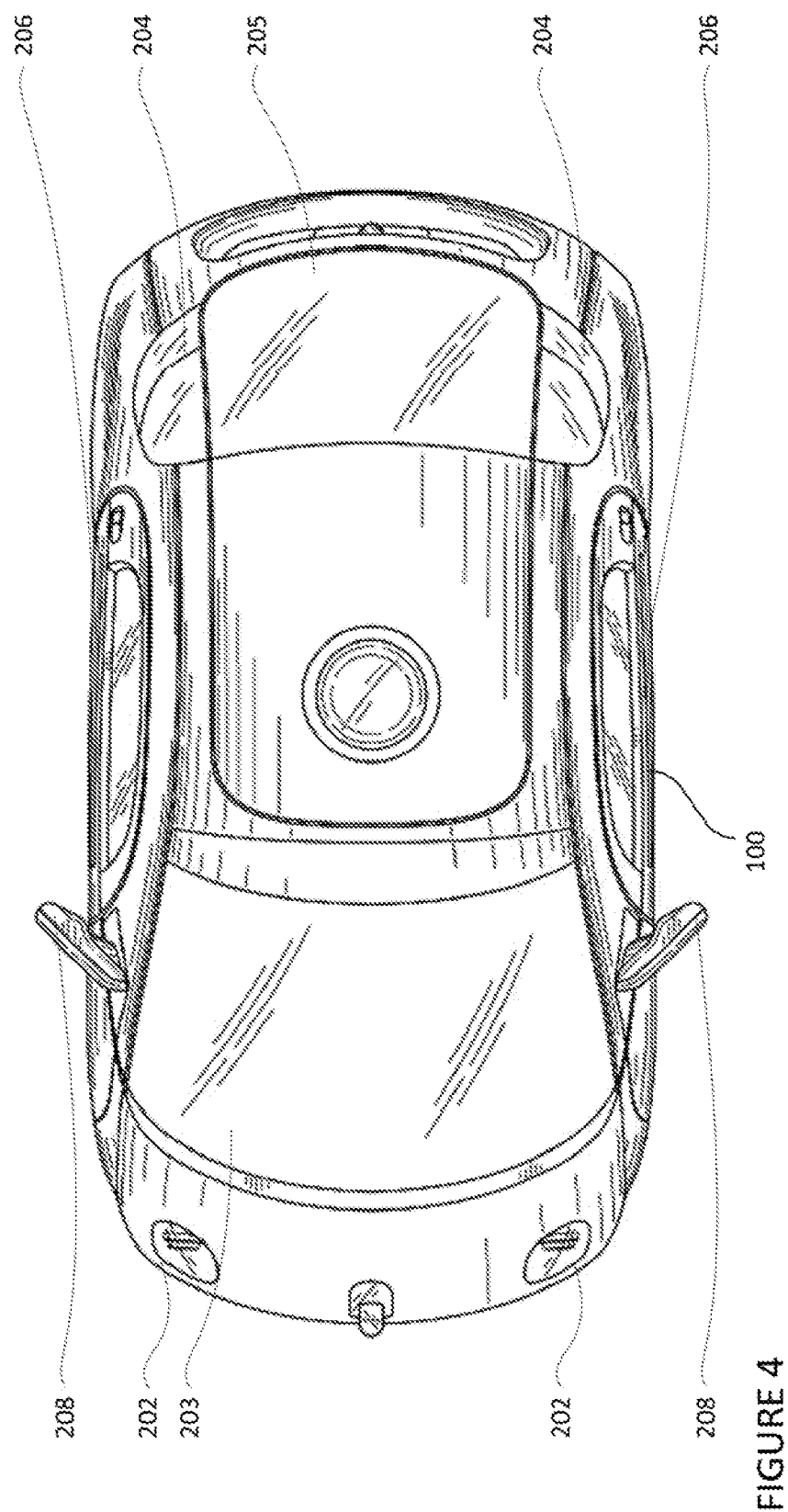
FIG. 4 is a top-down external view of a vehicle in accordance with aspects of the disclosure.

FIGS. 2-4 are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 204, and turn signal/parking lights 212 may be associated the signaling system 166. Light bar 207 may also be associated with the signaling system 166.

Vehicle 100 also includes sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing device 110.

The computing device 110 may control the direction and speed of the vehicle by controlling various components. By way of example, computing device 110 may navigate the vehicle to a destination location completely autonomously using data from the detailed map information and navigation system 168. In order to maneuver the vehicle, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing device 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As described above, the video display system 176 may receive information in order to generate video. In this regard, as the vehicle carries passengers on a trip to a destination, the vehicle's video display system 176 may monitor system data generated by the other computing devices regarding the vehicle's operation including data generated by the vehicle's navigation system, positioning system, and perception system. For instance, the data received by the video display system 176 may include objects external to the vehicle within a particular range from the vehicle's perception system 172, data from the positioning system 170, such as the vehicle's current location, and data from the navigation system 168, such as the vehicle's projected trajectory and map information.

Figure 5A:
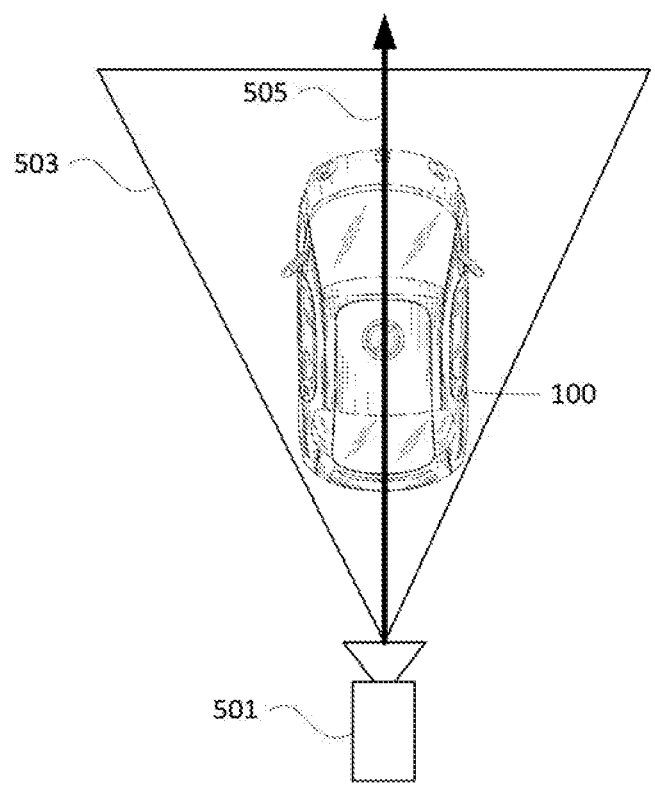
FIGS. 5A and 5B are illustrations of a virtual camera positioned at a default position in accordance with aspects of the disclosure.
Figure 5B:
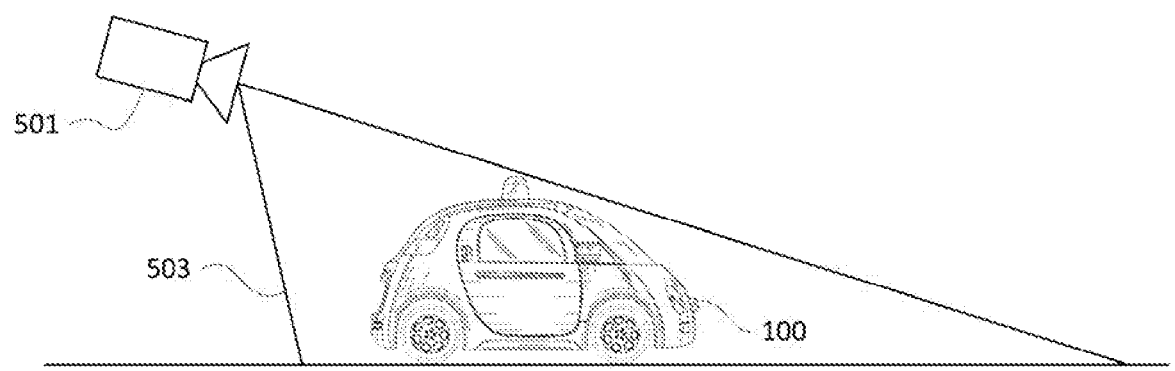

Based on the data received by the video display system 176 a video may be generated for display on a display in the vehicle for viewing by the vehicle's passengers. The video display system 176 may generate the video from a perspective of a virtual camera using the received data by overlaying the vehicle's projected trajectory and detected objects on a map corresponding to the route the vehicle is traveling. The perspective of a virtual camera may be fixed relative to the vehicle at a default position. For instance, this default position of the fixed position virtual camera 501 may be above and to the rear of the vehicle 100 and directed in a first heading 505, as shown in FIGS. 5A and 5B. The video may include imagery within a set field of view 503 corresponding to the first heading 505 and position of the fixed position virtual camera 501. The video display system 176 may update the video in substantially real-time by continually updating the vehicle's projected trajectory and detected objects on the map based on received data from the perspective of the virtual camera.

Figure 6:
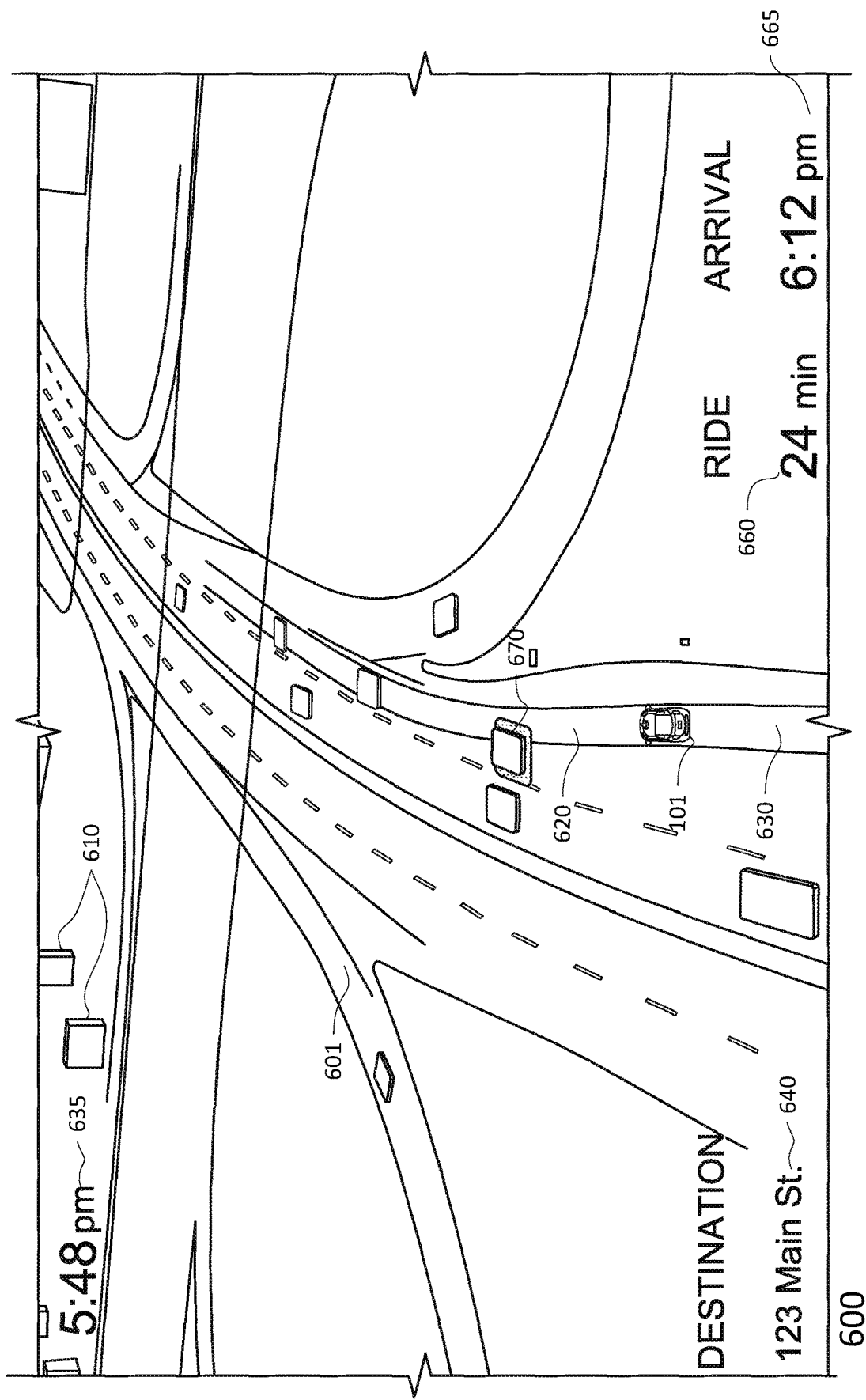
FIG. 6 is an illustration of a video frame showing a field of view of a virtual camera in accordance with aspects of the disclosure.

FIG. 6 is an example frame of a video generated by the video display system 176 from the perspective of a virtual camera positioned in the default position above and behind the vehicle. A frame 600 of the video containing a map 601 presented within a set field of view 503 of the virtual camera. The video further includes a virtual representation of the virtual vehicle 101 and the vehicle's surroundings, such as buildings 610, nearby vehicles 670, and other such surroundings, overlaid on the map 601 received from the navigation and perception systems 168 and 172. The location of the virtual vehicle 101 may be determined based on information received by the video display system 176 from the vehicle's position system. The vehicle's projected trajectory 620 and past route 630, received from the positioning system 170 and/or navigation system 168 are also overlaid on the map 601.

Additional messages, such as the current time 635, the destination 640, the time progress of the trip 660, and the estimated time to arrival 665 may also be overlaid on the video. Such additional messages may be generated by the vehicle's computing device 110 based on information received by the vehicle's other systems, such as systems 160-174. The video may include animations, illustrations, live-action, and/or other such content typically found in videos.

Upon the video display system receiving a notification that the vehicle is going to change lanes from the vehicle's current lane to an adjacent lane, the virtual camera may be rotated or otherwise translated to a predetermined height and the pitch of the virtual camera may be adjusted. As such, the virtual camera may capture imagery within an adjusted field of view corresponding to the virtual cameras new position, thereby capturing a larger area of the vehicle's environment, including a larger area behind the vehicle in comparison to the default position.

Figure 7A:
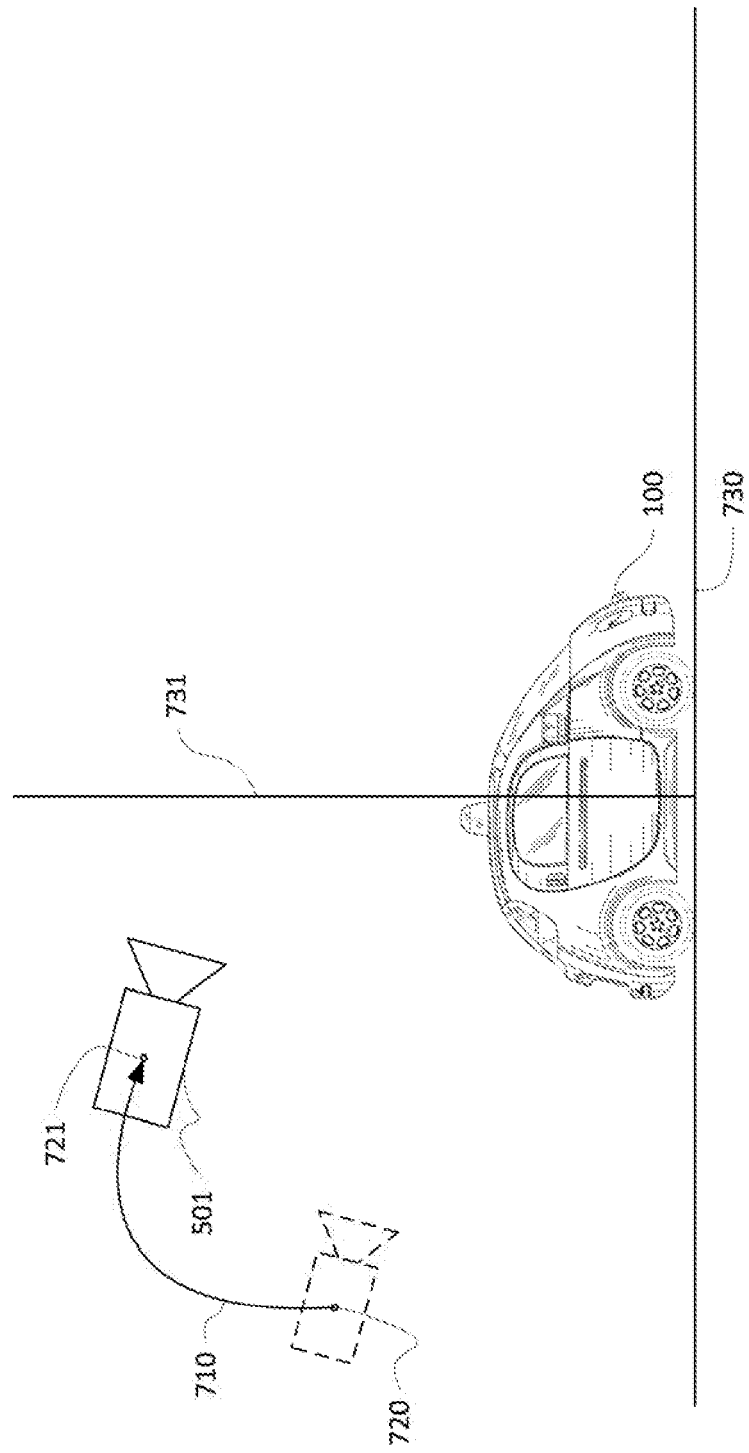
FIGS. 7A-7C are illustrations of a virtual camera repositioning to capture an updated field of view in accordance with aspects of the disclosure.

For instance, upon the video display system receiving a notification that the vehicle is going to change lanes, such as from the vehicle's navigation system 168, the position of the virtual camera may be repositioned from a default position 720 to an updated position 721, as shown in FIG. 7A. In this regard, the virtual camera 501 may be rotated in a first direction 710 around the vehicle towards a normal line 731 which is perpendicular to the ground 730 the vehicle 100 is currently positioned upon. In some instances, the virtual camera 501 may be translated to the updated position 721. The updated position 721 may correspond to a predetermined height above the vehicle 100 relative to the ground.

Figure 7B:
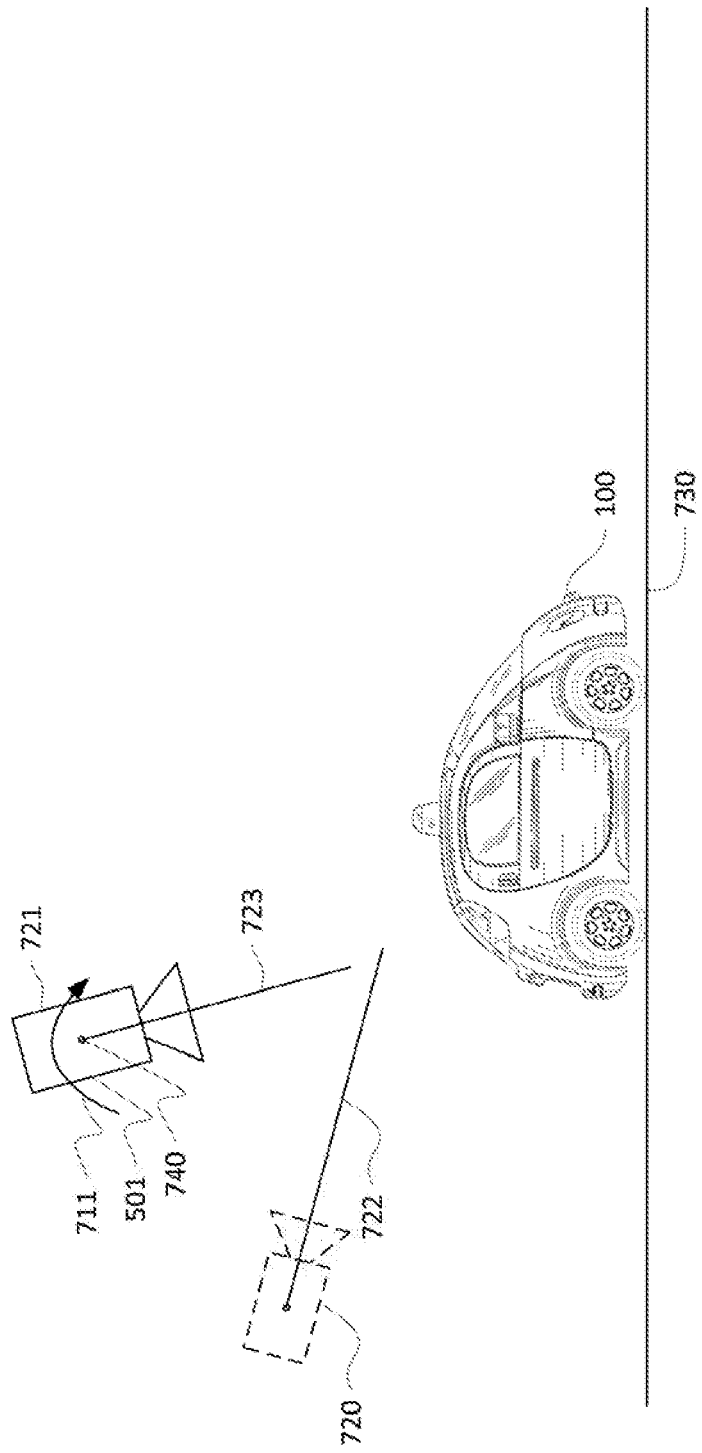

The pitch of the virtual camera may be adjusted concurrently, or sequentially with, the rotation of the virtual camera. For instance, as shown in FIG. 7B, the default position 720 of the virtual camera 501 may include the virtual camera being positioned with an initial pitch 722, relative to the ground 730. Concurrently, or sequentially with the repositioning of the virtual camera 501 from the default position 720 to the updated position 721, the pitch of the virtual camera 501 may be rotated around its center point 740 in a second direction 711 towards the ground 730 to an updated pitch 723 as further shown in FIG. 7B.

Figure 7C:
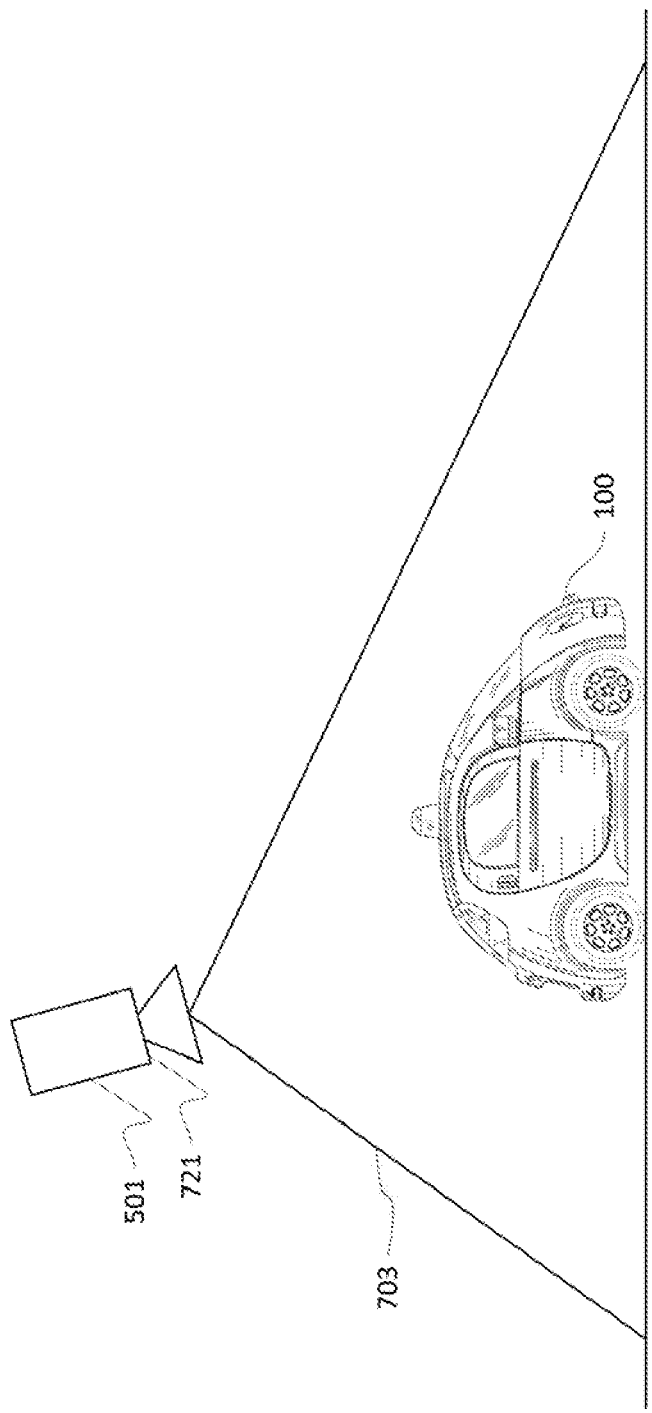

The video display system may present video within an adjusted field of view 703 corresponding to the vehicle's immediate surroundings captured at the updated position 721, as further shown in FIG. 7C. Although the examples shown herein include the vehicle changing from one lane to another, the virtual camera rotation may occur when the vehicle makes any lateral movements into a potential path of another vehicle or object, such as at a merge, parking garage, driveway, tollbooth, etc. Although the examples discussed herein show the virtual camera rotating upon determining a lane change is to occur, the virtual camera may rotate and its pitch may be adjusted at a predetermined time after a determination that a lane change is to occur, upon the projected trajectory being updated after determining where the lane change is to occur, during the lane change, or at any other time.

Figure 8:
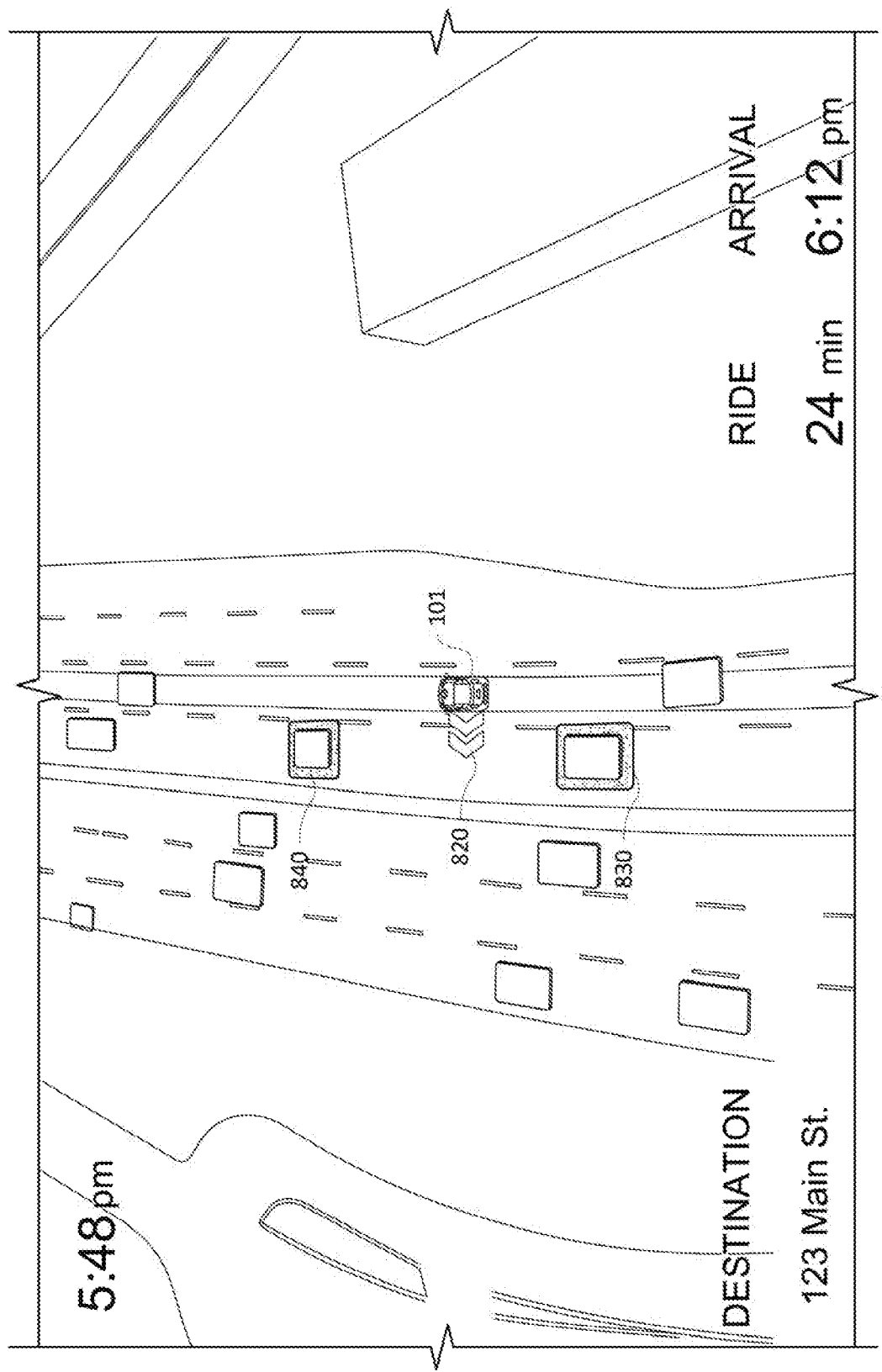
FIG. 8 is an illustration of a video frame showing a top-down field of view of a virtual camera in accordance with aspects of the disclosure.

FIG. 8 includes an example video frame 800 depicting a video generated by the video display system from the perspective of a virtual camera's new position. The video frame 800 shows a top-down perspective of the virtual vehicle 101 along with the vehicle's surroundings located in front of, behind, and otherwise around the vehicle after the virtual camera has been rotated and its pitch adjusted as described above. The larger area of the vehicle's environment may provide the passenger with knowledge of what is behind the vehicle so there are no blinds spots as the vehicle performs the lane change.

The video display system may provide a visual indicator within the generated video that the vehicle is going to change lanes. In this regard, the video display system may, upon receiving a notification that the vehicle is going to change lanes, overlay a visual indicator, such as a bar, arrows, chevrons, or other such indicator, on the video to inform the vehicle's passengers that a lane change is going to occur and, in some instances, the direction in which the lane change will occur. For instance, as further shown in FIG. 8, the video display system may overlay chevrons 820, which are directed towards the lane the vehicle is going to change into onto the video. In another example, the video display system may overlay bars (not shown) on the right and left side of the video. The bar which corresponds to the direction that the vehicle is changing lanes may be highlighted. In some instances, the visual indicator corresponding to the direction the vehicle is going to pullover towards may be pulsed or otherwise animated to indicate the pullover direction of the vehicle to the passenger.

An audio sound may be played before, during, or after a lane change to alert the passengers of the lane change. For instance, audio clips, such as audible beeps, music, a recorded or computer voice saying "changing lanes," "left," "right," "merging left/right," or other such phrase indicating and/or explaining a lane change, may be played within the vehicle to provide the passengers with information regarding the vehicle's actions. In this regard, the audio clip may provide the passengers with a notification that a lane change will, is, or has occurred and/or which direction the lane change has or will occur.

The video display system may provide a visual indication of objects within the vehicle's vicinity that are delaying the lane change from occurring. In this regard, the video display system may, upon receiving a notification that the vehicle is going to change lanes, highlight, pulse, or otherwise provide a visual indication of objects, such as vehicles which are influencing the vehicle's ability to change lanes in the video.

For instance, as further shown in FIG. 8, surrounding vehicles 830 and 840 in the lane onto which the vehicle is attempting to enter are highlighted as they are preventing, or potentially affecting the vehicle 101 from making the lane change. Other objects, such as construction cones, animals, pedestrians or other such objects may also be highlighted should they affect the vehicle's ability to change lanes. Upon an object no longer influencing the vehicle's ability to change lanes, the object may cease to be highlighted.

In some instances the visual indication of objects affecting the vehicle's ability to change lanes may be adjusted based on the object's influence. For instance, surrounding vehicles 830 and 840, which are within the lane the vehicle is attempting to turn and with a set vicinity of the vehicle may be highlighted or pulsed more strongly or frequently than other vehicles positioned far ahead, behind, or adjacent the vehicle.

Figure 9:
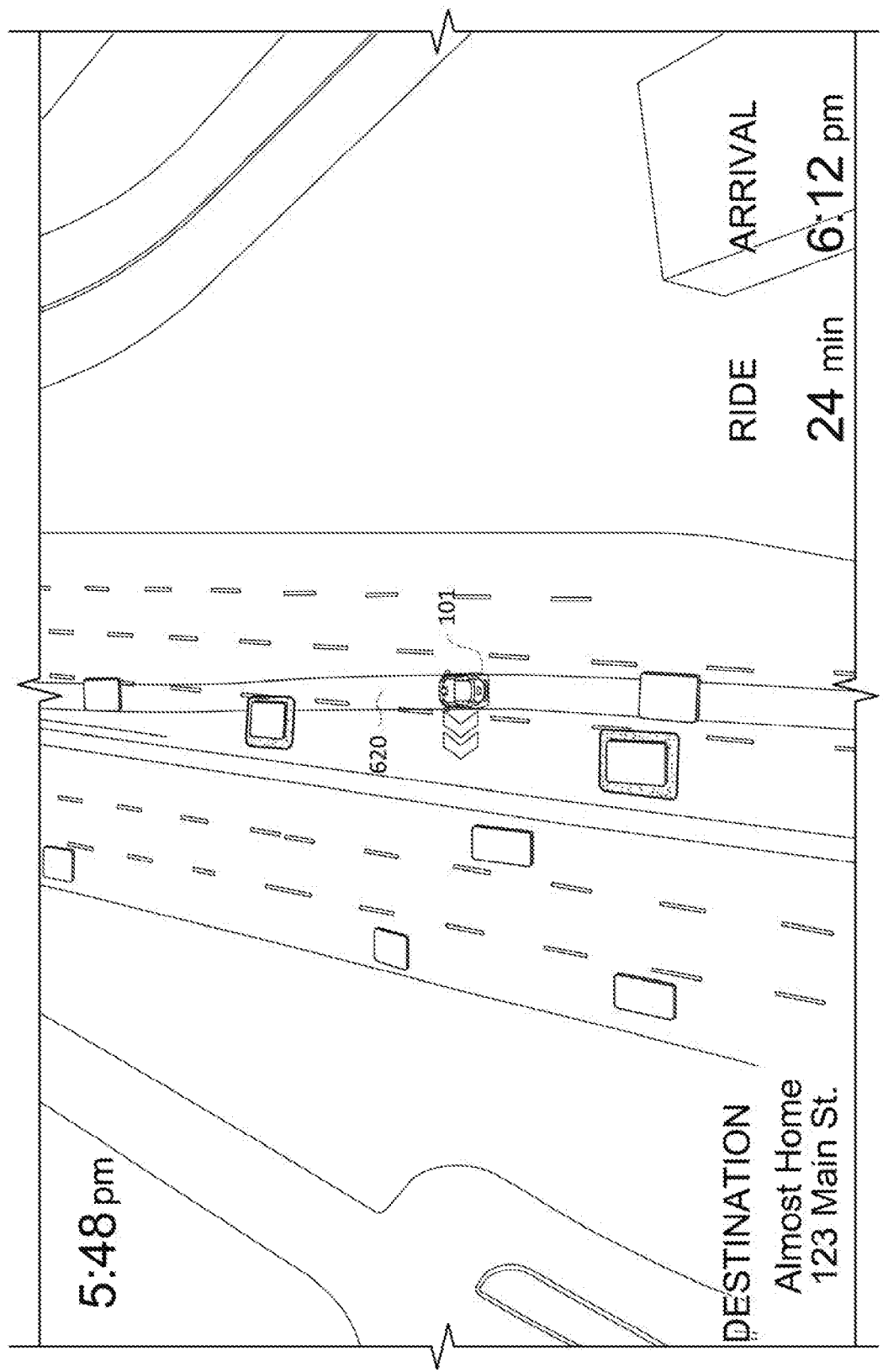
FIG. 9 is an illustration of highlighting objects which are influencing the vehicle in accordance with aspects of the disclosure.

The trajectory of the vehicle as depicted in the video may be updated to show where the vehicle will perform the lane change. For instance, as shown in example video frame 900 of FIG. 9, upon the vehicle's surrounding being cleared of objects which are preventing a lane change, the projected trajectory 620, such as provided by the navigation system 168 of the vehicle 101 is updated to show the locations where the vehicle will perform the lane change.

Figure 10:
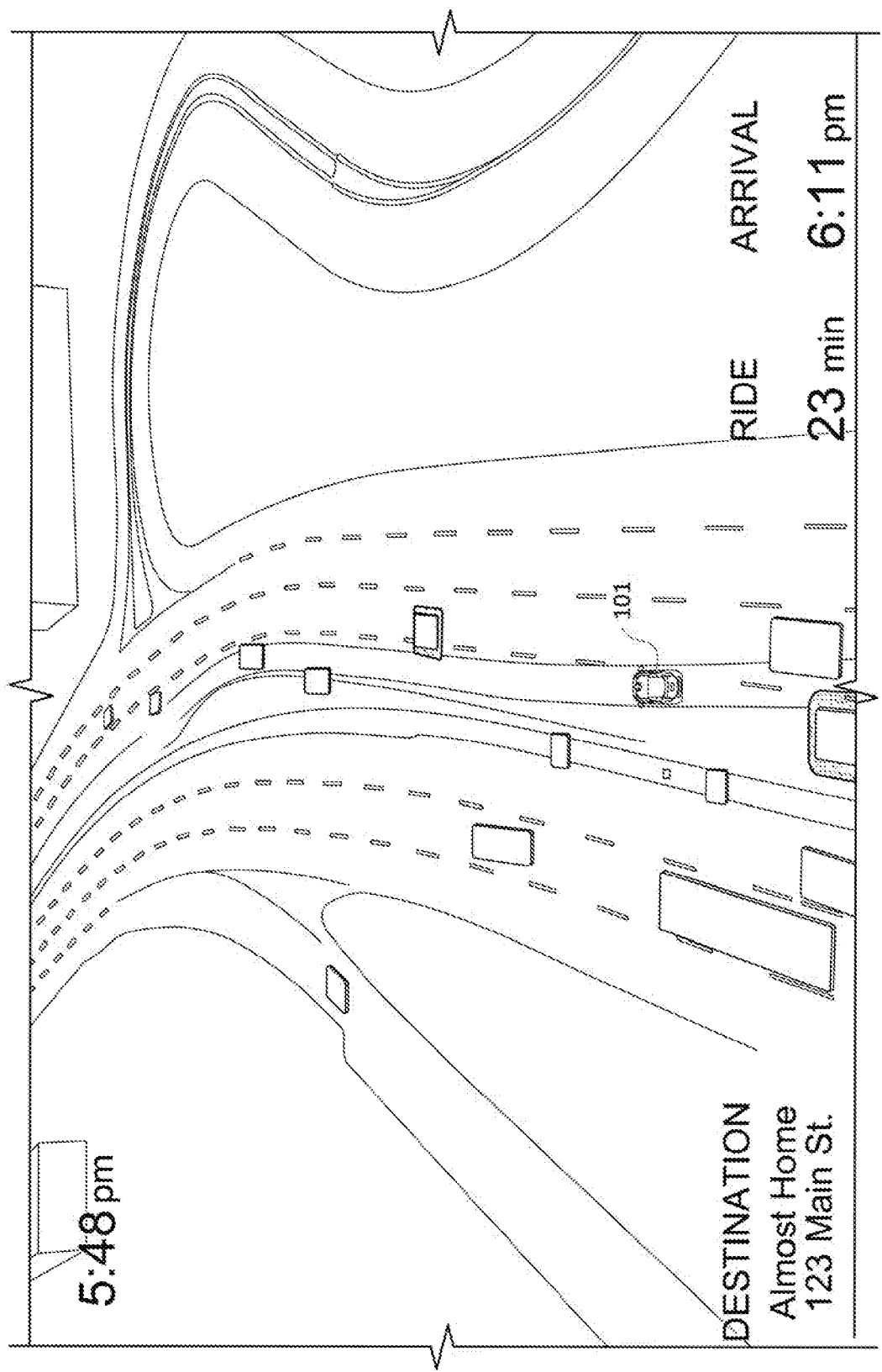
FIG. 10 is an illustration of an updated trajectory overlaid on a video in accordance with aspects of the disclosure.

During, or upon completion of the lane change, the virtual camera may return to the default position. For instance, as the vehicle is performing the lane change, the virtual camera rotates and adjusts its pitch back to the default position, for instance moving between video frame 900 and example video frame 1000 of FIG. 10. In video frame 1000, the visual indicator 820 which indicates that the vehicle 101 is going to perform a lane change may also be removed from the video.

In some embodiments the rotation and pitch adjustment of the virtual camera may be reversed or prevented when the vehicle is stopped or projected to stop. For instance, the virtual camera may receive the vehicle's projected trajectory and determine the vehicle is going to change lanes but will first pass through a stop light. As such, the virtual camera may not rotate until the car travels through the stop light.

Figure 11:
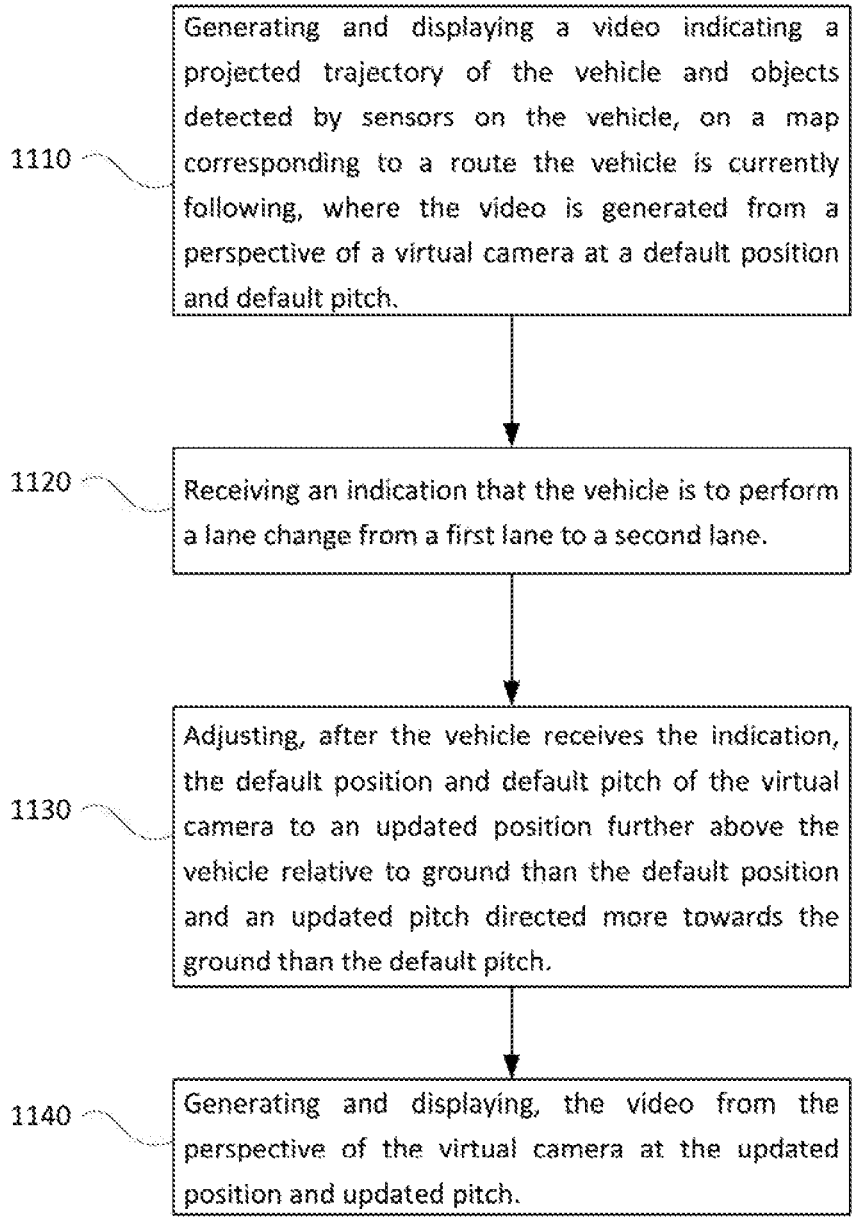
FIG. 11 is a flow diagram in accordance with aspects of the disclosure.

FIG. 11 is an example flow diagram 1100 which may be performed by one or more computing devices of a vehicle, such as computing device 110 of vehicle 100 in order to provide a lane change notification to passengers of the vehicle. In this example, the computing one or more computing devices may generate and display a video indicating a projected trajectory of the vehicle and objects detected by sensors on the vehicle, on a map corresponding to a route the vehicle is currently following, where the video is generated from a perspective of a virtual camera at a default position and default pitch, as shown in block 1110. The one or more computing devices may receive an indication that the vehicle is to perform a lane change from a first lane to a second lane and adjust, after the vehicle receives the indication, the default position and default pitch of the virtual camera to an updated position further above the vehicle relative to ground than the default position and an updated pitch directed more towards the ground than the default pitch, as shown in blocks 1120 and 1130. The one or more computing devices may generate and display the video from the perspective of the virtual camera at the updated position and the updated pitch, as shown in block 1140.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A virtual camera system, comprising:
one or more processors; and
a display,
wherein the one or more processors are configured to:
generate a video indicating a projected trajectory of an autonomous vehicle and objects detected by sensors on the vehicle, on a map corresponding to the projected trajectory, wherein the video is generated from a perspective of a virtual camera at a first position and a first pitch and the video is displayed on the display;
receive an indication that the vehicle is to change its position in an autonomous driving mode;
adjust, based on the indication, the first position of the virtual camera to a second position;
adjust, based on the indication, the first pitch of the virtual camera to a second pitch; and
generate the video from the perspective of the virtual camera at the second position and the second pitch and display the video on the display.

2. The virtual camera system of claim 1, wherein the change of the vehicle's position is made by performing a lane change from a first lane to a second lane.

3. The virtual camera system of claim 2, wherein the second position increases a height of the virtual camera relative to ground on which the vehicle is located.

4. The virtual camera system of claim 3, wherein the second pitch causes the virtual camera to be more directly pointed towards the ground than the first pitch.

5. The virtual camera system of claim 2, wherein the second position and the second pitch of the virtual camera are adjusted to the first position and the first pitch after the vehicle completes the lane change.

6. The virtual camera system of claim 2, wherein the virtual camera is adjusted to the second position upon the vehicle beginning to perform the lane change.

7. The virtual camera system of claim 2, wherein a visual indicator is generated and overlaid on the video which indicates a direction from the first lane to the second lane.

8. The virtual camera system of claim 7, wherein the visual indicator is removed upon completion of the lane change.

9. The virtual camera system of claim 1, wherein the virtual camera is adjusted to the second position at a predetermined time after the one or more processors receive the indication.

10. The virtual camera system of claim 1, wherein the second position is a predefined height above the vehicle based on the vehicle's speed.

11. A method of using a video camera system, the method comprising:
generating, by one or more processors, a video indicating a projected trajectory of an autonomous vehicle and objects detected by sensors on the vehicle, on a map corresponding to the projected trajectory, wherein the video is generated from a perspective of a virtual camera at a first position and a first pitch;
displaying the video on a display;
receiving, by the one or more processors, an indication that the vehicle is to change its position in an autonomous driving mode;
adjusting, by the one or more processors based on the indication, the first position of the virtual camera to a second position;
adjusting, by the one or more processors based on the indication, the first pitch of the virtual camera to a second pitch;
generating, by the one or more processors, the video from the perspective of the virtual camera at the second position and the second pitch; and
displaying the video on the display.

12. The method of claim 11, wherein the change of the vehicle's position is made by performing a lane change from a first lane to a second lane.

13. The method of claim 12, wherein the second position increases a height of the virtual camera relative to ground on which the vehicle is located.

14. The method of claim 13, wherein the second pitch causes the virtual camera to be more directly pointed towards the ground than the first pitch.

15. The method of claim 12, wherein the second position and the second pitch of the virtual camera are adjusted to the first position and the first pitch after the vehicle completes the lane change.

16. The method of claim 12, wherein the virtual camera is adjusted to the second position upon the vehicle beginning to perform the lane change.

17. The method of claim 12, wherein a visual indicator is generated and overlayed on the video which indicates a direction from the first lane to the second lane.

18. The method of claim 17, wherein the visual indicator is removed upon completion of the lane change.

19. The method of claim 11, wherein the virtual camera is adjusted to the second position at a predetermined time after the one or more processors receive the indication.

20. The method of claim 11, wherein the second position is a predefined height above the vehicle based on the vehicle's speed.

\* \* \* \* \*

UNITED STATES PATENT AND TRADEMARK OFFICE
CERTIFICATE OF CORRECTION

PATENT NO. : 11,195,415 B2
APPLICATION NO. : 16/749541
DATED : December 7, 2021
INVENTOR(S) : Nirmal Patel, Peter Crandall and Julien Mercay It is certified that error appears in the above-identified patent and that said Letters Patent is hereby corrected as shown below:

In the Claims

Claim 9, Column 12, Line 15:
Now reads: "ata"; should read -- at a --

Signed and Sealed this
Twenty-fourth Day of May, 2022

Katherine Kelly Vidal
*Director of the United States Patent and Trademark Office*